United States Patent [19]
Albers et al.

[11] Patent Number: 5,135,091
[45] Date of Patent: Aug. 4, 1992

[54] APPARATUS FOR OPERATING CLUTCHES IN MOTOR VEHICLES

[75] Inventors: Albert Albers, Bühl/Baden; Martin Schüth, Dortmund, both of Fed. Rep. of Germany

[73] Assignee: Luk Lamellen Und Kupplungsbau GMBH, Bühl, Fed. Rep. of Germany

[21] Appl. No.: 723,482

[22] Filed: Jun. 27, 1991

[30] Foreign Application Priority Data

Jun. 27, 1990 [DE] Fed. Rep. of Germany ....... 4020430

[51] Int. Cl.[5] ............................................ F16D 19/00
[52] U.S. Cl. ..................... 192/85 C; 192/83
[58] Field of Search ............ 192/32, 40, 70.11, 83, 192/85 C

[56] References Cited

U.S. PATENT DOCUMENTS

| | | | |
|---|---|---|---|
| 1,133,206 | 3/1915 | Welty | 192/83 |
| 2,104,580 | 1/1938 | Brewer | 192/83 X |
| 2,620,667 | 12/1952 | Flinn | 192/83 X |
| 4,505,364 | 3/1985 | Goucher et al. | 192/83 X |
| 5,042,631 | 8/1991 | Ellenberger et al. | 192/85 C |

FOREIGN PATENT DOCUMENTS 60-334  4/1985  Japan ................................. 192/83

*Primary Examiner*—Leslie A. Braun
*Assistant Examiner*—Nicholas Whitelaw
*Attorney, Agent, or Firm*—Peter K. Kontler

[57] ABSTRACT

Apparatus for engaging, disengaging and otherwise regulating the operation of an automated friction clutch in a motor vehicle has a pedal which can be depressed in the same way as the clutch pedal in a vehicle without an automated clutch. The speed of movement and/or the position of the pedal is monitored by a sensor which transmits appropriate signals to a circuit serving to engage, disengage and/or otherwise operate the clutch by way of a hydraulic system by taking into consideration one or more additional parameters, such as the RPM of the engine, the RPM of the input shaft of the variable-speed transmission and/or others. If the circuit and/or the hydraulic system is out of commission, the clutch is operated by a bypass power train which is independent of the circuit. Depression of the pedal is resisted by a biasing element in imitation of resistance which is encountered by the clutch pedal in a vehicle not embodying an automated friction clutch.

12 Claims, 1 Drawing Sheet

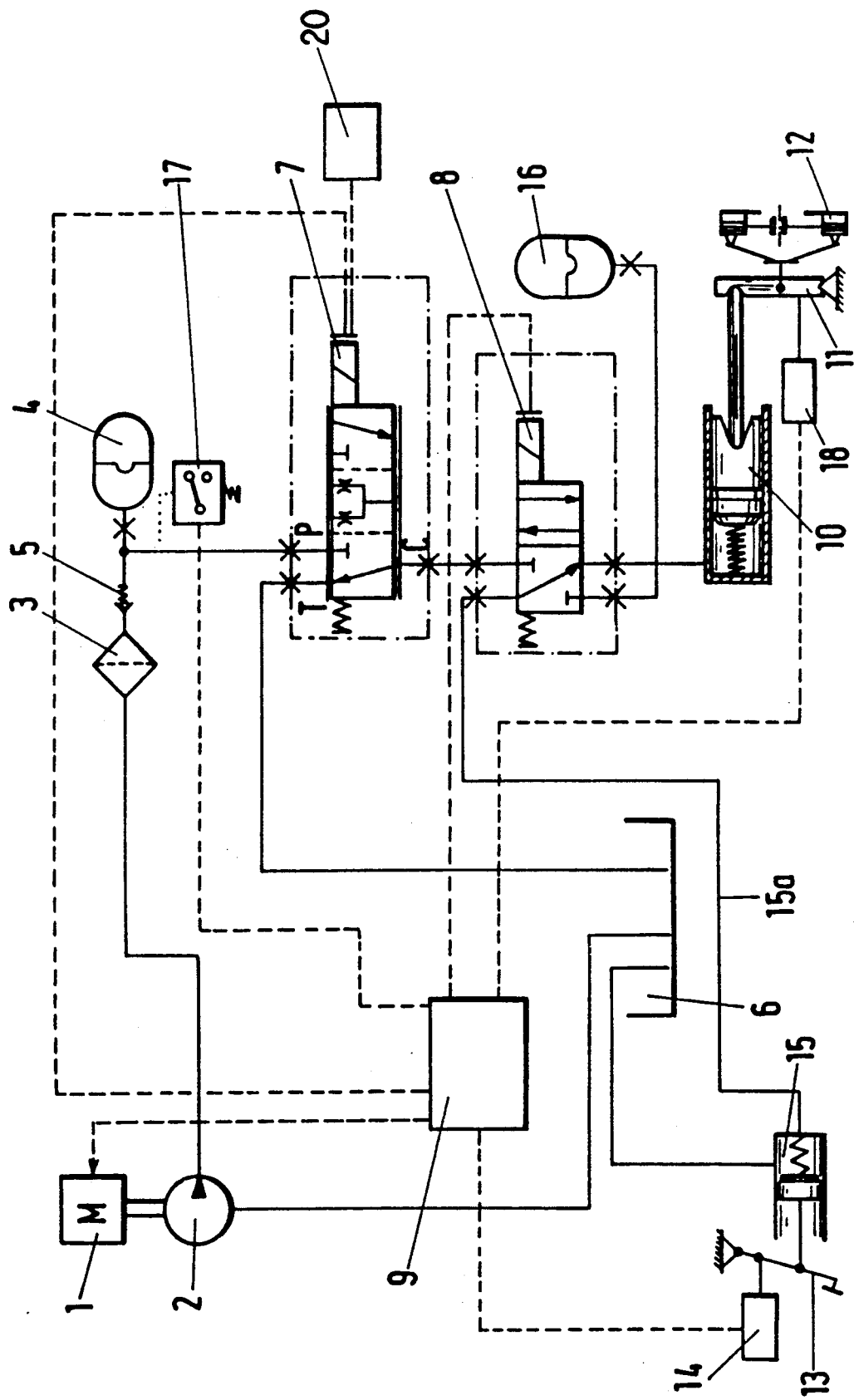

APPARATUS FOR OPERATING CLUTCHES IN MOTOR VEHICLES

BACKGROUND OF THE INVENTION

The invention relates to apparatus for operating clutches, particularly for operating friction clutches in motor vehicles. More particularly, the invention relates to improvements in apparatus of the type disclosed in commonly owned copending patent application Ser. No. 07/510,261 filed Apr. 17, 1990 by Wolfgang Reik et al. for "Method of and apparatus for regulating the operation of automatic clutches in motor vehicles".

The copending patent application of Reik et al. discloses an apparatus which serves to operate an automated friction clutch between the output element of the engine and the input element of the variable-speed transmission in a motor vehicle. The friction clutch is engaged and disengaged by a fluid-operated system which receives signals from an evaluating circuit. The evaluating circuit receives signals from sensors which monitor various parameters of the engine and of the transmission, clutch travel, the position of the throttle valve, the position of the shift linkage, the position of the gas pedal and others. The fluid-operated system selects the condition of the clutch during starting, driving, acceleration, braking, driving in reverse and/or parking of the motor vehicle and/or during transitions between such stages of operation. The operation of the clutch is fully automated, i.e., the vehicle which embodies such clutch need not and is not equipped with a clutch pedal. It has been found that vehicles with fully automated friction clutches failed to gain the expected widespread acceptance by the public in spite of their advantages, such as simplification of operation of the motor vehicle, greater comfort, greatly reduced likelihood of untimely or improper engagement or disengagement of the clutch and others.

OBJECTS OF THE INVENTION

An object of the invention is to provide a novel and improved apparatus for operating clutches, particularly friction clutches in motor vehicles.

Another object of the invention is to provide an apparatus which exhibits all advantages of an apparatus for use with automated friction clutches as well as all advantages of a conventional non-automated clutch engaging/disengaging apparatus.

A further object of the invention is to provide a simple and inexpensive apparatus which can be installed in many existing types of motor vehicles and which can be used to engage or disengage available friction clutches.

An additional object of the invention is to provide a motor vehicle which embodies the above outlined apparatus.

Still another object of the invention is to provide an apparatus which is constructed and assembled in such a way that it can be immediately put to use in motor vehicles to be operated by drivers who are accustomed to standard pedal-operated clutch engaging and disengaging mechanisms.

A further object of the invention is to provide a clutch engaging and disengaging apparatus whose energy requirements are low and which enables the driver to initiate engagement or disengagement of the clutch, when necessary, irrespective of the failure of the automated part of the apparatus.

SUMMARY OF THE INVENTION

The invention is embodied in an apparatus for engaging and disengaging a friction clutch, particularly in a motor vehicle. The improved apparatus comprises an output device which is actuatable to change the condition of the clutch, a man-operated input device, a first power train which is installed between the two devices to actuate the output device in response to operation of the input device, and a bypass power train which is installed between the two devices to actuate the output device in lieu of the first power train, in response to operation of the input device, in the event of malfunction of the first power train.

The input device can include a clutch pedal, such as the standard clutch pedal of a motor vehicle, which is movable between a plurality of positions, and the first power train can include means for generating signals which denote the positions of the pedal and preferably fluid-operated means for actuating the output device as a function of the signals. The fluid-operated means can include a source of pressurized fluid and at least one signal-regulatable valve which connects the source with the output device. The signal generating means of the first power train can include means for monitoring the positions of the pedal and for generating first signals, and a circuit (e.g., a circuit including a computer and a signal evaluating means) having means for processing the first signals and for regulating the at least one valve with processed first signals.

The output device can comprise a first fluid-operated motor which is connected with the clutch (e.g., by means of a linkage), and the bypass power train can comprise a second fluid-operated motor which is connected with the pedal and a conduit which connects the two motors. The at least one valve is installed in the conduit to normally seal the motors from each other and to thus open or deactivate the bypass power train in response to processed signals denoting satisfactory functioning of the first power train.

The bypass power train can further comprise a biasing element which is connected with the second motor when the at least one valve seals the motors from each other. Such biasing element can include a diaphragm type fluid accumulator which is operative to oppose the movements of the pedal between various positions with a force at least approximating the force which is required to change the condition of the clutch by the output device when the at least one valve does not seal the conduit. The at least one valve can be of the type known as 3/2-way valve.

The apparatus can further comprise means for transmitting to the circuit of the first power train additional signals which denote the pressure of fluid in the source. The circuit comprises means for disconnecting the source from the output device in response to additional signals denoting a drop of fluid pressure in the source below a predetermined value.

Means can be provided for supplying pressurized fluid to the source in response to signals from the circuit.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single Figure of the drawing is a diagrammatic view of an apparatus which embodies one form of the invention, the bypass power train being shown in the operative condition in which the pedal of the input device can actuate the output device by way of two fluid-operated motors one of which forms part of the bypass power train and the other of which forms part of the output device.

DESCRIPTION OF PREFERRED EMBODIMENTS

The apparatus which is shown in the drawing serves to engage and disengage a friction clutch 12 of the type used in motor vehicles. The apparatus comprises a motor 1 which can constitute the engine of a motor vehicle and drives a pump 2, preferably a hydraulic pump. It is presently preferred to drive the pump 2 by a motor (particularly an electric motor) other than the engine of the motor vehicle, i.e., the motor 1 can operate the pump 2 independently of the condition of the engine. The pump 2 conveys a stream of pressurized fluid (such as oil) through a filter 3 into a source 4 of pressurized fluid (e.g., an accumulator) which constitutes one component of a first power train. A check valve 5 between the filter 3 and the source 4 prevents return flow of pressurized fluid toward the pump 2. The motor 1 and the pump 2 can be said to constitute a means for supplying pressurized fluid to the source 4, namely in response to signals from an electronic control circuit 9 constituting another component of the first power train. The suction intake of the pump 2 is connected to an oil tank 6.

The pump 2 is further connected with a solenoid-operated flow regulating valve 7 of the first power train, and the valve 7 is connected, by a second solenoid-operated valve 8, with a fluid-operated motor (slave cylinder) 10 of an output device which can engage or disengage the clutch 12 by way of the first power train in response to signals from the circuit 9. The valves 7 and 8 control the motor 10 of the output device only when the pressure in the source 4 exceeds a predetermined minimum value and in the absence of malfunctioning of any other component(s) of the first power train which, in addition to the components 9, 4, 7 and 8, further comprises a sensor 14 (e.g., a potentiometer) serving to transmit (first) signals denoting various positions of a clutch pedal 13 which can be said to constitute a man-operated input device of the improved apparatus. The motor 10 can engage or disengage the friction clutch 12 by way of a linkage 11 which can be said to constitute the second component of the output device.

When the pressure in the source 4 exceeds the aforementioned predetermined minimum value and the electronic circuit 9 functions properly, the power train 14, 9, 4, 7, 8 is used to engage or disengage the friction clutch 12 by way of the output device 10, 11 in response to changes of the speed and/or position of the input device or clutch pedal 13. Such changes in the speed and/or position of the pedal 13 are detected by the sensor or monitoring means 14, and corresponding first signals are transmitted to and are processed in the circuit 9 which has outputs connected with the solenoids of the valves 7, 8 and inputs connected with the sensor 14, with a sensor 18 (e.g., a potentiometer) serving to transmit signals denoting the positions of the linkage 11 (and hence the condition of the clutch 12), and with a switch 17 constituting a means for transmitting (additional) signals denoting the pressure of fluid in the source 4. Thus, the clutch 13 is normally engaged or disengaged by the first power train 14, 9, 4, 7, 8 in response to appropriate changes in the position of the clutch pedal 13 and/or in response to changes in the speed at which the pedal 13 is moved between different positions. Signals from the sensor 14 are processed by the circuit 9 and are used to control the valves 7, 8 so as to ensure automatic changes in the condition of the clutch 12 in response to changes in the position and/or speed of movement of the pedal 13.

The improved apparatus further comprises a second power train (hereinafter called bypass power train) which includes a fluid-operated motor (master cylinder) 15 and a conduit 15a connecting the motors 10, 15 and containing the valve 8. The arrangement is such that, whenever the primary or first power train is operative, the valve 8 seals the motors 10, 15 from each other (i.e., the bypass power train is open or idle) and the condition of the clutch 12 is changed solely by the first power train. When the valve 8 seals the motor 15 from the motor 10, it connects the motor 15 with a biasing element 16 preferably in the form of a diaphragm- or membrane-type accumulator which is designed to offer to depression of the pedal 13 a resistance resembling that encountered by the clutch pedal in a motor vehicle which does not embody an automated friction clutch. In other words, a driver who is accustomed to actuating a clutch pedal in a motor vehicle wherein the clutch can be engaged or disengaged in a single way (such as by way of components corresponding to the motors 15, 10, conduit 15a and linkage 11) will not realize that, as a rule, depression of the gas pedal entails a change in the condition of the clutch 12 in response to modified first signals which are transmitted by the circuit 9.

The switch 17 is designed to transmit to the corresponding input of the circuit 9 a signal as soon as the pressure in the source 4 drops below a preselected minimum value which is still sufficient to ensure proper functioning of the first power train. Such signal from the switch 17 causes the circuit 9 to transmit to the valve 8 a signal which is necessary to seal the source 4 from the motor 10 and to connect the motor 10 with the motor 15. At the same time, the biasing element 16 is disconnected from the motor 15. The clutch pedal 13 is then in a position to change the condition of the clutch 12 in a conventional way, i.e., the first power train including the sensor 14, the circuit 9, the source 4 and the valve 7 is bypassed. The valving element (e.g., a spool) of the valve 8 is shown in that position in which the first power train is ineffective and the conduit 15a establishes an operative connection between the motors 10 and 15.

The switch 17 can further serve to transmit to the circuit 9 a signal when the pressure in the source 4 drops to a value which barely suffices to ensure proper operation of the first power train. The circuit 9 then starts the motor 1 which drives the pump 2 until the pressure in the source 4 rises to a predetermined maximum permissible value; at such time, a signal from the switch 17 induces the circuit 9 to arrest the motor 1. As already mentioned above, that signal from the switch 17 which denotes that the pressure in the source 4 is too low induces the circuit 9 to move the valving element of the valve 8 to the illustrated position in which the bypass power train is ready to change the condition of the clutch 12 in response to manipulation of the pedal 13 and in response to changes of other parameters.

The valves 7 and 8 are (or can constitute) standard solenoid-operated valves with resetting springs for their valving elements. The solenoids of the valves 7, 8 receive signals from the corresponding outputs of the circuit 9. For example, the valve 7 can constitute a so-called 3/3-way regulating valve which functions as a volume-proportional valve. This means that the valving element of the valve 7 is shifted to an extent which is a function of at least one characteristic of the signal from the circuit 9 to thereby effect a proportional change in the rate of flow of pressurized fluid from the source 4 to the valve 8. It is also possible to employ a volume-proportional valve 7 in the form of a 4/4-way valve or in the form of a regulating valve which is controlled in dependency on the pulse width modulation.

The source 4 can be designed in such a way that it permits at least one initial disengagement of the clutch 12 when the motor vehicle is started.

The sensor 18 monitors the position of the linkage 11 in the output device 10, 11 and transmits appropriate signals to the corresponding input of the circuit 9. Thus, the circuit 9 invariably receives information denoting the momentary position of the linkage 11, i.e., the momentary condition of the clutch 12.

An important advantage of the improved apparatus is that the clutch 12 can be engaged and disengaged by the clutch pedal 13 through the motor 15, conduit 15a, motor 10 and linkage 11 when the motor 1 for the pump 2 is idle and the source 4 does not contain any fluid or does not contain a supply of fluid under requisite pressure to ensure proper operation of the motor 10 through the medium of the first power train. The same situation arises when the circuit 9 is defective for any reason, e.g., due to the absence of electric energy and/or a short circuit At such time, the circuit 9 automatically sets the valve 8 to, or permits the valving element of the valve 8 to assume a, position in which the conduit 15a is not sealed so that the motor 15 can operate the motor 10 and the motor 10 can move the linkage 11 in order to engage or disengage and/or otherwise control the clutch 12.

When the pressure in the source 4 drops to the aforementioned minimum acceptable value, the switch 17 induces the circuit 9 to transmit a signal which starts the motor 1 so that the pump 2 raises the pressure in the source 4 to a maximum permissible value at which the signal from the switch 17 induces the circuit 9 to arrest the motor 1. The circuit 9 invariably maintains the valving element of the valve 8 in the illustrated position as long as the pressure in the source 4 suffices to ensure proper engagement or disengagement of the clutch 12 by way of the first power train. The motor 15 is then connected with the biasing element 16 which ensures that the pedal 13 offers an expected resistance to depression, i.e., a resistance which a driver expects from her or his experiences with the driving of a motor vehicle embodying a non-automated friction clutch.

If the driver of the vehicle depresses the pedal 13 while the first power train is operative, the sensor 14 transmits a first signal which is processed by the circuit 9. The vehicle is then set in motion in the following way: When the difference between the driving and driven sections of the friction clutch 12 drops below a threshold value, the actuation of the clutch is switched from clutch travel to regulation of slip, all as disclosed in the copending patent application of Reik et al. To this end, the circuit 9 receives signals denoting additional parameters, such as the RPM of the engine, the RPM of the input shaft of the variable-speed transmission, the load upon the engine, the selected gear into which the transmission has been shifted and, if necessary, one or more additional parameters.

The first power train exhibits the advantage that it can compensate for improper manipulation and/or prevent improper manipulation of the gas pedal 13 from influencing the condition of the clutch 12. Thus, the utilization of an apparatus embodying the first power train renders it possible to rely on automatic clutch adjustment the same as by resorting to the apparatus which is disclosed in the copending patent application of Reik et al. For example, when the first power train is operative, the apparatus can enhance the comfort of the driver and of other occupants of the vehicle by eliminating or reducing the extent of longitudinal back and forth movements of the motor vehicle, known as jerking, as well certain other undesirable movements which could affect the comfort of the occupant or occupants.

The switch 17 and the sensor 14 are or can be operatively connected to each other (by way of the circuit 9) in such a way that, when the pressure of fluid in the source 4 is too low, a signal from the switch 17 to the circuit 9 initiates a shifting from the first power train to the bypass power train only when the clutch pedal 13 is maintained in or close to the starting or neutral position.

It is further possible to employ a manually operable switch 20 which can be used to set the apparatus for operation with the first power train or with the second power train, i.e., to eliminate automatic shifting of the valve element of the valve 8 in response to signals from the circuit 9.

The improved apparatus renders it possible to ensure the utilization of an automated friction clutch in a motor vehicle which is to be operated by a driver who insists upon or prefers the provision of a clutch pedal in the motor vehicle. Such driver gains the impression that she or he is actually controlling the clutch in the same way as is customary in connection with a nonautomated friction clutch even though, at least in most instances, engagement and disengagement of the clutch are controlled in a fully automatic way. Otherwise stated, the driver depresses the clutch pedal in the same way as in a vehicle without an automated friction clutch but, at least in most instances, the engagement or disengagement of the clutch 12 is controlled by the circuit 9 rather than by the motor 15. At the same time, the biasing element 16 causes the driver to gain the impression that actuation of the gas pedal 13 has initiated engagement or disengagement of the clutch 12 because the element 16 ensures that the resistance to depression of the gas pedal is the same as, or closely approximates, that of a gas pedal in a vehicle without an automated friction clutch. At the same time, and as long as the circuit 9 and other components of the first power train function satisfactorily, the engagement or disengagement of the clutch 12 is actually initiated by the circuit 9 in dependency on changes of one or more additional parameters which have no relationship with the position of the clutch pedal 13. The circuit 9 can compensate for a number of driver errors such as premature engagement of the clutch when the engine torque is insufficient for such engagement. At the same time, the apparatus is capable of engaging and disengaging the clutch 12 in the conventional way as soon as the first power train is incapable of performing its function.

As a rule, the circuit 9 will comprise a processor with a computer. The processor preferably includes a memory which stores information in the form of characteristic curves and/or diagrams or fields to ensure proper and timely engagement or disengagement of the clutch 12 as well as proper regulation of operation of the engaged clutch. The characteristic curves and/or characteristic fields can be indicative of various positions and/or various speeds of movement of the pedal 13 between its positions. The processor of the circuit 9 can be designed to process additional signals which are selected to and which should influence the condition of the clutch and should be taken into consideration in processing signals from the sensor 14, i.e., those signals which are indicative of the position and/or speed of movement of the pedal 13. The additional signals can be indicative of the slip of the engaged clutch, the load upon the engine, the selected gear of the variable-speed transmission and/or other parameters (preferably engine parameters), particularly as described in the copending patent application of Reik et al.

The valve 8 can be a so-called 3-2-way valve with a reciprocable valving element which can be shifted by a solenoid.

The improved apparatus is susceptible of many additional modifications without departing from the spirit of the invention. For example, the biasing element 16 can be used in addition to or in lieu of one or more mechanical springs (not shown). As explained above, this biasing element and/or its equivalent(s) will preferably be designed with a view to ensure that actuation of the pedal 13 necessitates the exertion of the same effort as that of actuating a clutch pedal in a motor vehicle which is not equipped with an automated friction clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An apparatus comprising a friction clutch having an engaged and a disengaged condition; an output device actuatable to change the condition of said clutch, said output device comprising a first fluid-operated motor which is connected with said clutch; a man-operated input device comprising a pedal which is movable between a plurality of positions; a first power train installed between said devices to actuate said output device in response to operation of said input device, said first power train including means for generating signals which denote the positions of said pedal, said signal generating means including means for monitoring the positions of said pedal and for generating signals; fluid-operated means for actuating said output device as a function of said signals, said fluid-operated means comprising a source of pressurized fluid and at least one signal-regulatable valve connecting said source with said output device, said signal generating means further comprising means for processing the signals which are generated by said monitoring means and for regulating said at least one valve with processed signals; and a bypass power train installed between said devices to actuate said output device in lieu of said first power train, in response to operation of said input device, in the event of malfunction of said first power train, said bypass power train comprising a second fluid-operated motor which is connected with said pedal and a conduit connecting said motors, said at least one valve being installed in said conduit to normally seal said motors from each other and to thus open said bypass power train in response to processed signals denoting satisfactory functioning of said first power train.

2. The apparatus of claim 1, wherein said bypass power train further comprises a biasing element which is connected with said second motor when said at least one valve seals said motors from each other.

3. The apparatus of claim 2, wherein said biasing element comprises a diaphragm type fluid accumulator.

4. The apparatus of claim 2, wherein said biasing element is operative to oppose the movements of said pedal between said positions with a force at least approximating the force which is required to change the condition of said clutch by said output device when said at least one valve does not seal said conduit.

5. The apparatus of claim 1, wherein said at least one valve is a 3/2-way valve.

6. An apparatus comprising a friction clutch having an engaged and a disengaged condition; an output device actuatable to change the condition of said clutch; a man-operated input device comprising a pedal which is movable between a plurality of positions; a first power train installed between said devices to actuate said output device in response to operation of said input device, said first power train including means for generating signals which denote the positions of said pedal, said signal generating means including means for monitoring the positions of said pedal and for generating first signals; fluid-operated means for actuating said output device as a function of said first signals, said fluid-operated means comprising a source of pressurized fluid and at least one signal-regulatable valve connecting said source with said output device, said signal generating means further comprising a circuit having means for processing said first signals and for regulating said at least one valve with processed signals; a bypass power train installed between said devices to actuate said output device in lieu of said first power train, in response to operation of said input device, in the event of malfunction of said first power train; and means for transmitting to said circuit additional signals denoting the pressure of fluid in said source, said circuit having means for disconnecting said source from said output device in response to additional signals denoting a drop of fluid pressure in said source below a predetermined value.

7. An apparatus comprising a friction clutch having an engaged and a disengaged condition; an output device actuatable to change the condition of said clutch; a man-operated input device comprising a pedal which is movable between a plurality of positions; a first power train installed between said devices to actuate said output device in response to operation of said input device, said first power train including means for generating signals which denote the positions of said pedal, said signal generating means including means for monitoring the positions of said pedal and for generating first signals; fluid-operated means for actuating said output device as a function of said first signals, said fluid-operated means comprising a source of pressurized fluid and at least one signal-regulatable valve connecting said source with said output device, said signal generating means further comprising a circuit having a means for processing said first signals and for regulating said at least one valve with processed signals; a bypass power train installed between said devices to actuate said output device in lieu of said first power train, in response to operation of said input device, in the event of malfunction of said first power train; and means for supplying pressurized fluid to said source in response to signals from said circuit.

8. An apparatus comprising a friction clutch having an engaged and a disengaged condition; an output device actuatable to change the condition of said clutch; a man-operated input device comprising a pedal which is movable between a plurality of positions; a first power train installed between said devices to actuate said output device in response to operation of said input device; and a bypass power train installed between said devices to actuate said output device in lieu of said first power train, in response to operation of said input device, only in the event of malfunction of said first power train; and means for opposing the movements of said pedal between said positions, in the event of proper functioning of said first power train, with a force which is required to change the condition of said clutch by said pedal in the event of malfunction of said first power train.

9. The apparatus of claim 8, wherein said output device comprises a first motor which is connected with said clutch and said bypass power train comprises a second motor which is connected with said pedal, which is disconnected from said first motor in the event of proper functioning of said first power train, and which is connected with said first motor in the event of malfunction of said first power train.

10. An apparatus comprising a friction clutch having an engaged and a disengaged condition; an output device actuatable to change the condition of said clutch, said output device comprising a first fluid-operated motor which is connected with said clutch; a man-operated input device comprising a pedal which is movable between a plurality of positions; a first power train installed between said devices to actuate said output device in response to operation of said input device, said first power train including means for generating signals which denote the speed of movement of said pedal, said signal generating means including means for monitoring the speed of movement of said pedal and for generating signals; fluid-operated means for actuating said output device as a function of said signals, said fluid-operated means comprising a source of pressurized fluid and at least one signal-regulatable valve connecting said source with said output device, said signal generating means further comprising means for processing the signals which are generated by said monitoring means and for regulating said at least one valve with processed signals; and a bypass power train installed between said devices to actuate said output device in lieu of said first power train, in response to operation of said input device, in the event of malfunction of said first power train, said bypass power train comprising a second fluid-operated motor which is connected with said pedal and a conduit connecting said motors, said at least one valve being installed in said conduit to normally seal said motors from each other and to thus open said bypass power train in response to processed signals denoting satisfactory functioning of said first power train.

11. An apparatus comprising a friction clutch having an engaged and a disengaged condition; an output device actuatable to change the condition of said clutch; a man-operated input device comprising a pedal which is movable between a plurality of positions; a first power train installed between said devices to actuate said output device in response to operation of said input device, said first power train including means for generating signals which denote the speed of movement of said pedal, said signal generating means including means for monitoring the speed of movement of said pedal and for generating first signals; fluid-operated means for actuating said output device as a function of said first signals, said fluid-operated means comprising a source of pressurized fluid and at least one signal-regulatable valve connecting said source with said output device, said signal generating means further comprising a circuit having means for processing said first signals and for regulating said at least one valve with processed signals; a bypass power train installed between said devices to actuate said output device in lieu of said first power train, in response to operation of said input device, in the event of malfunction of said first power train; and means for transmitting to said circuit additional signals denoting the pressure of fluid in said source, said circuit means having means for disconnecting the source from said output device in response to additional signals denoting a drop of fluid pressure in said source below a predetermined value.

12. An apparatus comprising a friction clutch having an engaged and a disengaged condition; an output device actuatable to change the condition of said clutch; a man-operated input device comprising a pedal which is movable between a plurality of positions; a first power train installed between said devices to actuate said output device in response to operation of said input device, said first power train including means for generating signals which denote the speed of movement of said pedal; said signal generating means including means for monitoring the speed of movement of said pedal and for generating first signals; fluid-operated means for actuating said output device as a function of said first signals, said fluid-operated means comprising a source of pressurized fluid and at least one signal-regulatable valve connecting said source with said output device, said signal generating means further comprising a circuit having means for processing said first signals and for regulating said at least one valve with processed signals; a bypass power train installed between said devices to actuate said output device in lieu of said first power train, in response to operation of said input device, in the event of malfunction of said first power train; and means for supplying pressurized fluid to said power in response to signals from said circuit.

* * * * *